(12) United States Patent
Yang

(10) Patent No.: US 7,855,899 B2
(45) Date of Patent: *Dec. 21, 2010

(54) CONTROLLER WITH LOOP IMPEDANCE MODULATION FOR POWER CONVERTER

(75) Inventor: Ta-yung Yang, Milpitas, CA (US)

(73) Assignee: System Genreal Corp., Taipei Hsien (TW)

( * ) Notice: Subject to any disclaimer, the term of this patent is extended or adjusted under 35 U.S.C. 154(b) by 325 days.

This patent is subject to a terminal disclaimer.

(21) Appl. No.: 11/626,026

(22) Filed: Jan. 23, 2007

(65) Prior Publication Data

US 2008/0174293 A1 Jul. 24, 2008

(51) Int. Cl.
G05F 1/575 (2006.01)

(52) U.S. Cl. .................. 363/21.15; 323/297; 363/49

(58) Field of Classification Search ............. 363/21.15, 363/21.07, 21.01, 21.12–21.14, 21.16–21.18, 363/97; 323/288, 902, 297, 49
See application file for complete search history.

(56) References Cited

U.S. PATENT DOCUMENTS

| | | | |
|---|---|---|---|
| 4,541,041 A | 9/1985 | Park et al. | |
| 4,937,728 A * | 6/1990 | Leonardi | 363/97 |
| 5,028,861 A | 7/1991 | Pace et al. | |
| 5,481,178 A | 1/1996 | Wilcox et al. | |
| 5,689,407 A * | 11/1997 | Marinus et al. | 363/21.15 |
| 5,747,977 A | 5/1998 | Hwang | |
| 6,370,042 B2 * | 4/2002 | Gattavari et al. | 363/21.01 |
| 6,487,059 B2 * | 11/2002 | Bontempo et al. | 361/90 |
| 6,906,934 B2 * | 6/2005 | Yang et al. | 363/49 |
| 2005/0248965 A1 * | 11/2005 | Yamada et al. | 363/21.08 |
| 2005/0281062 A1 * | 12/2005 | Choi et al. | 363/21.08 |

* cited by examiner

Primary Examiner—Harry Behm
(74) Attorney, Agent, or Firm—J.C. Patents

(57) ABSTRACT

A control circuit is provided to generate a mode signal at light load of the power converter. The mode signal is coupled to disable the switching signal for saving power. The impedance of an input circuit is increased in response to the mode signal. Furthermore, a soft start circuit is initiated by the mode signal when switching signal is enabled. An external capacitor associates with the impedance of the input circuit determine the off period of the switching signal.

14 Claims, 3 Drawing Sheets

CONTROLLER WITH LOOP IMPEDANCE MODULATION FOR POWER CONVERTER

BACKGROUND OF THE INVENTION

1. Field of the Invention

The present invention relates to power converters, and more specifically relates to the control of switching power converters.

2. Description of Related Art

Switching power converters have been widely used to provide regulated voltage and current. However, the switching of power converter will cause power losses such as conduction loss and switching loss, in which the switching loss is the significant power loss at light load. In order to maintain high efficiency of power converter at light load, many techniques have been proposed to reduce the power consumption, such as "Full load to no-load control for a voltage fed resonant inverter" by Park, et al, U.S. Pat. No. 4,541,041; "Strobed DC-DC converter with current regulation" by Pace, et al, U.S. Pat. No. 5,028,861; "Control circuit and method for maintaining high efficiency over broad current ranges in a switching regulator circuit" by Wilcox, et al, U.S. Pat. No. 5,481,178; "Switching regulator having low power mode responsive to load power consumption" by Jeffrey Hwang, U.S. Pat. No. 5,747,977. However, the drawback of these prior arts is the load detection circuit of the power converter. A hysteresis comparator is utilized to detect the load condition and on/off state of the power converter. The switching frequency of the power converter cannot be programmed especially when acoustic noise is generated. Besides, the output ripple caused by the burst switching is uncontrollable. These shortcomings are the main object of the present invention to overcome.

SUMMARY OF THE INVENTION

The present invention provides a control circuit including a switching circuit coupled to a feedback loop of the power converter to generate a switching signal in response to a feedback signal for regulating output. A soft start circuit generates a soft start signal coupled to switching circuit to control the pulse width of the switching signal for the soft start. An input circuit is connected to the feedback loop. A comparison circuit is coupled to the feedback loop to generate a mode signal when the feedback signal is lower than a threshold signal. The mode signal is used to disable the switching signal for saving power. The mode signal is further coupled to reset the soft start circuit for enabling soft start of the switching signal when switching signal is enabled. The impedance of the input circuit is increased in response to the enablement of the mode signal. The resistance of the input circuit associated with the capacitance of an external capacitor determines the off period of the switching signal.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

DESCRIPTION OF THE PREFERRED EMBODIMENTS

Figure 1:
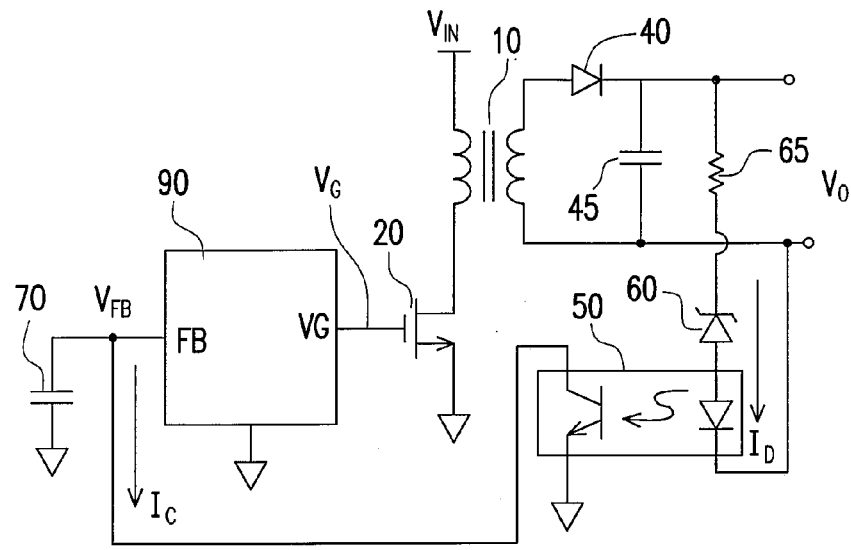
FIG. 1 shows a schematic diagram of a power converter.

FIG. 1 shows a circuit schematic of a power converter. A control circuit 90 generates a switching signal $V_G$ to regulate the output of the power converter in response to a feedback signal $V_{FB}$ at a feedback terminal FB. The switching signal $V_G$ drives a power transistor 20 for switching a transformer 10. The transformer 10 is connected to an input voltage $V_{IN}$ of the power converter for energy storage and power transfer. The energy of the transformer 10 is transferred to the output of the power converter through a rectifier 40 and a capacitor 45. An output voltage $V_O$ is coupled to an opto-coupler 50 through a resistor 65 and zener diode 60. The output of the opto-coupler 50 is connected to the feedback terminal FB of the controller 90 to form a feedback loop. The pulse width of the switching signal $V_G$ is modulated in response to the feedback signal $V_{FB}$ to achieve the regulation of the power converter.

Figure 2:
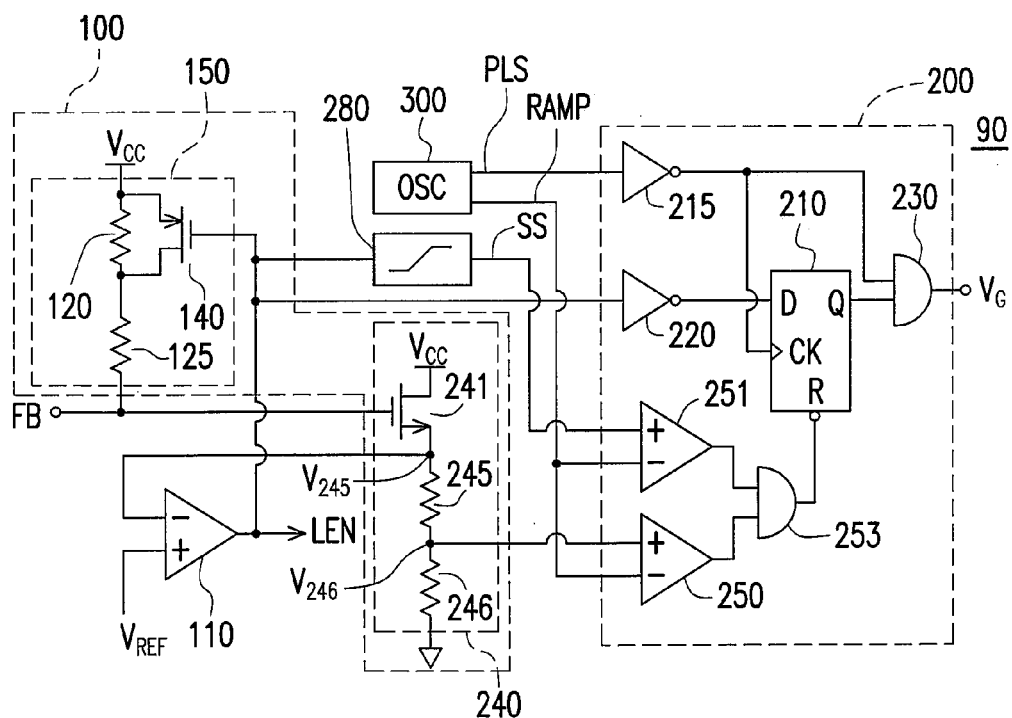
FIG. 2 is a preferred embodiment of a control circuit of the power converter according to the present invention.

FIG. 2 shows a preferred embodiment of the controller 90 according to the present invention. The controller 90 includes a comparison circuit 110, an input circuit 100, a switching circuit 200, a soft start circuit 280 and an oscillation circuit 300.

The switching circuit 200 is used to generate the switching signal $V_G$ in response to an oscillation signal PLS. The oscillation circuit 300 is adapted to periodically generate the oscillation signal PLS and a ramp signal RAMP. In one embodiment of the present invention, the switching circuit 200 includes a flip-flop 210 to generate the switching signal $V_G$ through an AND gate 230. The input of the AND gate 230 is connected to the output of the flip-flop 210. Another input of the AND gate 230 is connected to the oscillation signal PLS through an inverter 215 to limit the maximum duty cycle of the switching signal $V_G$. The flip-flop 210 is enabled in response to the oscillation signal PLS. An AND gate 253 is coupled to reset the flip-flop 210. The output of comparators 250 and 251 are connected to inputs of the AND gate 253. The positive input of the comparator 250 is connected to the input circuit 100. The negative input of the comparator 250 is coupled to the ramp signal RAMP for the pulse width modulation (PWM). The negative input of the comparator 251 is also coupled to the ramp signal RAMP. The positive input of the comparator 251 is coupled to receive a soft start signal SS for the soft start of the switching signal $V_G$.

In one embodiment of the present invention, the input circuit 100 includes a resistive device 150 and the feedback input circuit 240. The feedback input circuit 240 is coupled to the output of the power converter through the feedback terminal FB and the feedback loop of the power converter (shown in FIG. 1). A transistor 241 and resistors 245 and 246 form the feedback input circuit 240. The transistor 241 performs the level shift. The feedback signal $V_{FB}$ is connected to the gate of the transistor 241. A feedback signal $V_{245}$ is generated at the source of the transistor 241. Resistor 245 and 246 further provides attenuation to the feedback signal $V_{245}$ to stabilize the feedback loop. The resistor 245 is connected to the feedback signal $V_{245}$. An attenuated feedback signal $V_{246}$ is generated at the resistor 246. The feedback signal $V_{246}$ is connected to the positive input of the comparator 250 for PWM control.

The comparison circuit 110 is coupled to the feedback input circuit 240 to generate a mode signal LEN when the feedback signal $V_{245}$ is lower than a threshold signal $V_{REF}$. The mode signal LEN indicates the light load of the power converter. Wherein the mode signal LEN resets the soft start circuit for enabling soft start of the switching signal when switching signal is enabled. The control circuit 90 further comprises an external capacitor 70 coupled to the input circuit 100. An external capacitor 70 is coupled to the feedback terminal FB as shown in FIG. 1. A resistive device 150 is coupled to the feedback terminal FB as well. The resistive device 150 and the external capacitor 70 operate as a low-pass filter for the feedback signal $V_{FB}$. A transistor 140 and resistors 120 and 125 constitute the resistive device 150. The resistor 120 and the resistor 125 are connected in serial. The transistor 140 is connected to the resistor 120 in parallel. The mode signal LEN controls the on/off of the transistor 140. Therefore, the resistance of the resistive device 150 is increased in response to the enablement of the mode signal LEN.

The resistance of the input circuit 100 will be increased once the mode signal LEN is enabled, which causes the feedback signal $V_{FB}$ to become low. The switching signal $V_G$ will be turned on again when the feedback signal $V_{FB}$ is charged up to a voltage $V_B$. The voltage $V_B$ can be expressed as, $$V_B = V_A \times \left(1 - \varepsilon^{\frac{-T_{OFF}}{R \times C}}\right) \quad (1)$$

$$V_B = V_{REF} + V_{241} \quad (2)$$

in which the voltage $V_A$ is given by, $$V_A V_{CC} - (I_C \times R) \quad (3)$$

$$I_C = CTR \times I_D \quad (4)$$

$$I_D = \frac{V_O - V_Z - V_D}{R_{65}} \quad (5)$$

where $T_{OFF}$ is the off period of the switching signal $V_G$; R is the resistance of the resistive device 150; C is the capacitance of the external capacitor 70; $V_{REF}$ is the voltage of the threshold signal $V_{REF}$; $V_{241}$ is the threshold voltage of transistor 241; $I_C$ is a feedback current, which is the output current of the opto-coupler 50 (shown in FIG. 1); $I_D$ is the input current of the opto-coupler 50 (shown in FIG. 1); CTR is the current transfer rate of the opto-coupler 50; $V_D$ is the forward voltage drop of the opto-coupler 50; $V_Z$ is the voltage of the zener diode 60; $R_{65}$ is the resistance of the resistor 65.

The equation (1) can be rewritten as, $$T_{OFF} = R \times C \times \ell_n \left(\frac{V_A}{V_A - V_B}\right) \quad (6)$$

The capacitance C of the external capacitor 70 associated with the resistance R of the resistive device 150 determines the $T_{OFF}$ of the switching signal $V_G$. The feedback current $I_C$ is further coupled to adjust the $T_{OFF}$ to control the output ripple of the power converter.

Figure 3:
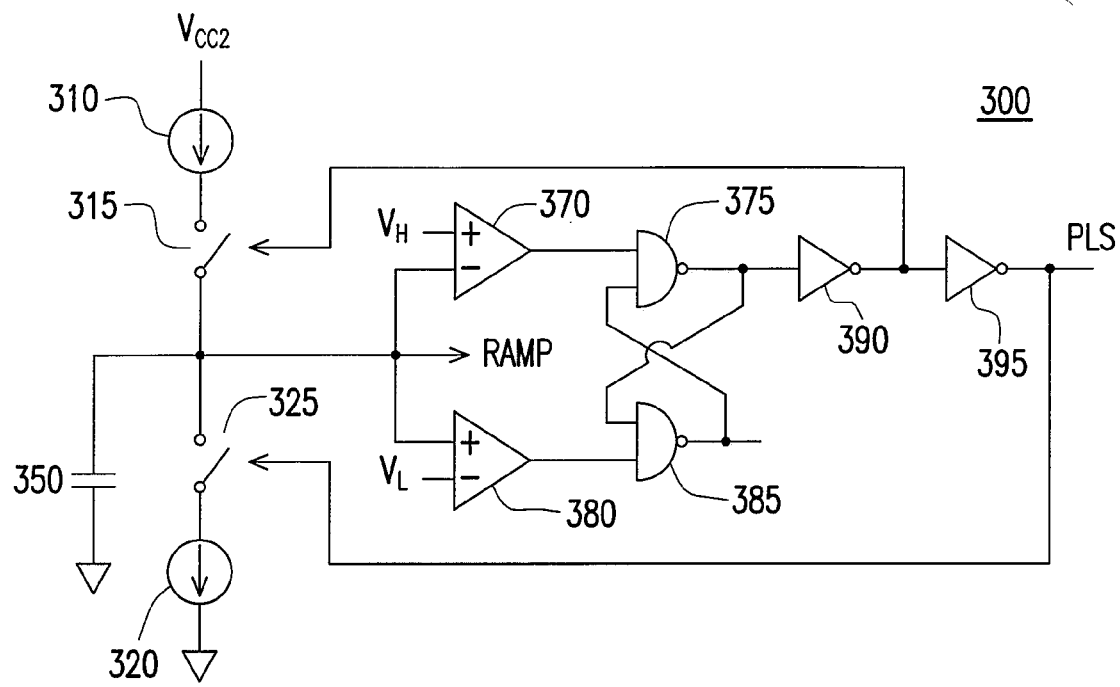
FIG. 3 shows an oscillation circuit according to a preferred embodiment of the present invention.

FIG. 3 shows the oscillation circuit 300 according to a preferred embodiment of the present invention. A charge current 310 is connected to a switch 315 in serial for charging a capacitor 350. A discharge current 320 is connected to a switch 325 in serial for discharging the capacitor 350. The ramp signal RAMP is therefore generated on the capacitor 350. Comparators 370, 380 and NAND gates 375, 385 generate the oscillation signal PLS. The oscillation signal PLS is connected to control switches 315 and 325 through inverters 390 and 395 respectively. Trip-point voltages $V_H$ and $V_L$ are connected to comparators 370 and 380 respectively. The ramp signal RAMP thus swings in between the trip-point voltage $V_H$ and $V_L$.

Figure 4:
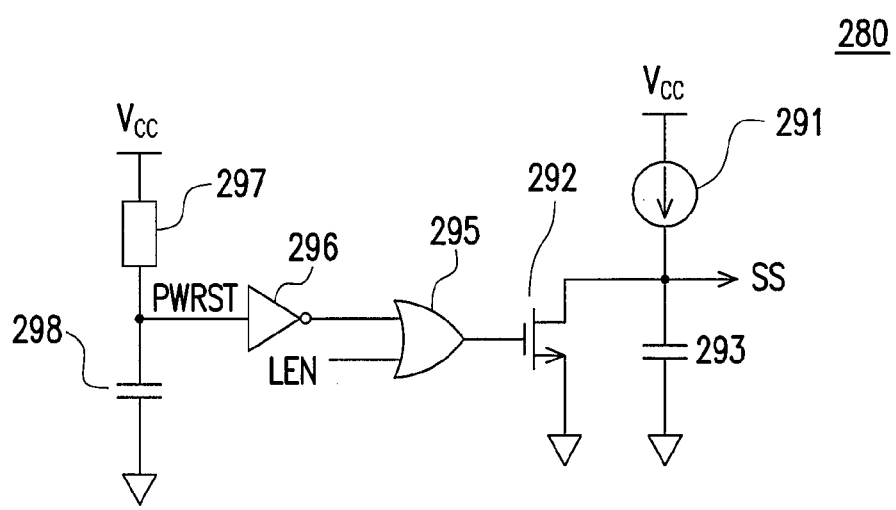
FIG. 4 is a soft start circuit according to a preferred embodiment of the present invention

FIG. 4 shows the soft start circuit 280 according to a preferred embodiment of the present invention. A charge current 291 is connected to charge a capacitor 293. A transistor 292 is connected to the capacitor 293 in parallel for discharging the capacitor 293. The soft start signal SS is generated on the capacitor 293. An OR gate 295 is connected to control the on/off of the transistor 292. An input of the OR gate 295 is connected to the mode signal LEN. Another input of the OR gate 295 is coupled to a power-on-reset signal PWRST through an inverter 296. A resistive device 297 and a capacitor 298 generate the power-on-reset signal PWRST during the power on of the controller 90. Therefore, the capacitor 293 is reset in response to the power-on-reset signal PWRST and/or the mode signal LEN. The soft start signal SS is further coupled to control the pulse width of the switching signal $V_G$ for the soft start.

Figure 5:
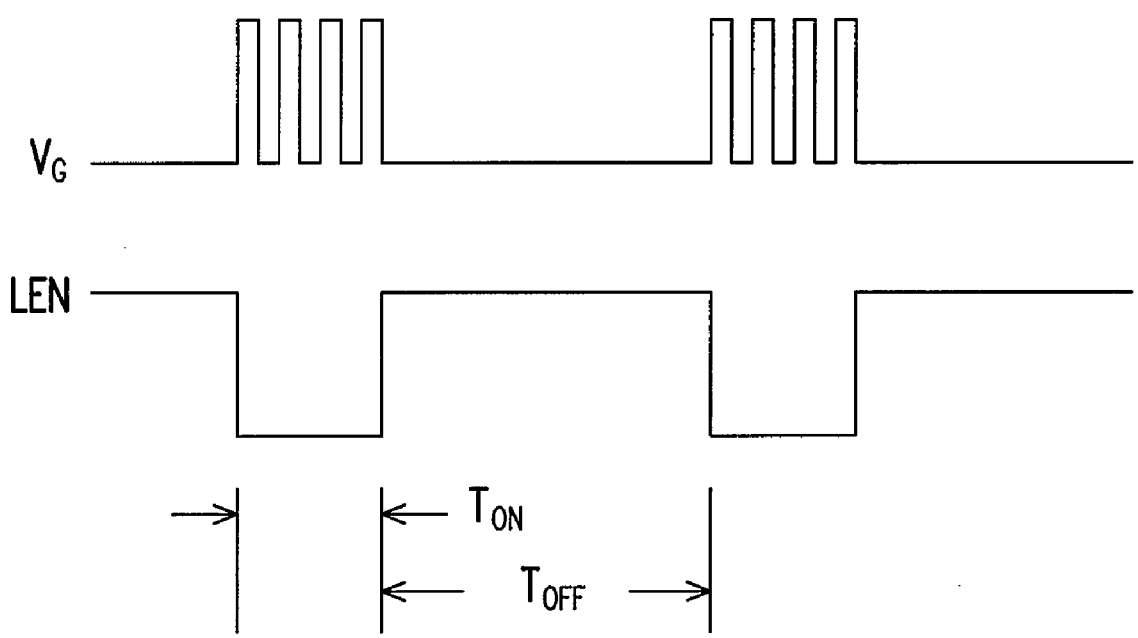
FIG. 5 shows switching signal waveforms according to a preferred embodiment of the present invention.

FIG. 5 shows the switching signal VG and the mode signal LEN. The switching signal VG is enabled during the TON period. The period of TON is depended on the load condition and the feedback. Once the feedback signal V245 is lower than the threshold signal VREF, the mode signal LEN will be enabled to turn off the switching signal VG. The TOFF period can be programmed by the external capacitor 70 to prevent the switching frequency of the switching signal VG from falling into the audio band.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A control circuit of a power converter, comprising:
   a switching circuit, coupled to a feedback loop of the power converter to generate a switching signal in response to a feedback signal for output regulation, wherein the feedback loop is from a secondary winding of a transformer of the power converter, and the feedback signal is associated with an output voltage of the power converter;
   a soft start circuit, coupled to switching circuit and generating a soft start signal to control the switching signal;
   a resistive device, coupled to the feedback loop, wherein the resistive device comprises a transistor connected with a first resistor in parallel, the transistor directly connected to a voltage supply and a second resistor connected with the first resistor in series; and
   a comparison circuit, coupled to the feedback loop and directly connected to the switching circuit for comparing the feedback signal with a threshold signal and generating a mode signal to the switching circuit,
   wherein the mode signal is used to disable the switching signal for saving power, control on/off of the transistor of the resistive device so as to modulate an impedance of the resistive device and reset the soft start circuit for enabling soft start of the switching signal when the switching signal is enabled.

2. The control circuit of the power converter as claimed in claim 1, further comprising an external capacitor coupled to the resistive device.

3. The control circuit of the power converter as claimed in claim 2, wherein the external capacitor associated with the resistive device determine an off period of the switching signal of the power converter.

4. The control circuit of the power converter as claimed in claim 1, wherein the mode signal is enabled once the feedback signal is lower than the threshold signal.

5. The control circuit of the power converter as claimed in claim 1, wherein the impedance of the resistive device is increased when the mode signal is enabled.

6. A controller of a power converter, comprising:
a switching circuit, coupled to a feedback loop of the power converter to generate a switching signal in response to a feedback signal, wherein the feedback loop is from a secondary winding of a transformer of the power converter, and the feedback signal is associated with an output voltage of the power converter;
a comparison circuit, coupled to the feedback loop and directly connected to the switching circuit to generate a mode signal when the feedback signal of the feedback loop is lower than a threshold signal; and
a resistive device, coupled to the feedback loop, wherein the resistive device comprises a transistor connected with a first resistor in parallel, the transistor directly connected to a voltage supply and a second resistor connected with the first resistor in series;
wherein the mode signal is connected to disable the switching signal for saving power and control on/off of the transistor of the resistive device such that a resistance of the resistive device is increased in response to the mode signal.

7. The controller of the power converter as claimed in claim 6, further comprising an external capacitor coupled to the resistive device.

8. The controller of the power converter as claimed in claim 7, wherein the external capacitor associated with the resistive device determine an off period of the switching signal.

9. The controller of the power converter as claimed in claim 6, further comprising a soft start circuit, wherein the soft start circuit is coupled to the switching circuit and generates a soft start signal to control the switching signal.

10. The controller of the power converter as claimed in claim 9, wherein the mode signal is coupled to reset the soft start circuit for enabling soft start of the switching signal when the switching signal is enabled.

11. A control circuit of a power converter, comprising:
a switching circuit, coupled to an input circuit of the power converter to generate a switching signal in response to a feedback signal, wherein the feedback loop is from a secondary winding of a transformer of the power converter, and the feedback signal is associated with an output voltage of the power converter;
a resistive device, coupled to the switching circuit, wherein the resistive device comprises a transistor connected with a first resistor in parallel, the transistor directly connected to a voltage supply and a second resistor connected with the first resistor in series; and
a comparison circuit, coupled to the input circuit of the power converter and directly connected to the switching circuit to generate a mode signal when the feedback signal of the input circuit is lower than a threshold signal;
wherein the mode signal is connected to turn off the switching signal for saving power according to the mode signal and control on/off of the transistor of the resistive device such that and an impedance of the input circuit is increased in response to the mode signal.

12. The control circuit of the power converter as claimed in claim 11, further comprising an external capacitor coupled to the input circuit.

13. The control circuit of the power converter as claimed in claim 12, wherein the external capacitor coupled to the impedance of the input circuit determine an off period of the switching signal.

14. A controller of a power converter, comprising:
a switching circuit, coupled to an input circuit of the power converter to generate a switching signal in response to a feedback signal, wherein the feedback loop is from a secondary winding of a transformer of the power converter, and the feedback signal is associated with an output voltage of the power converter;
a resistive device, coupled to the switching circuit, wherein the resistive device comprises a transistor connected with a first resistor in parallel, the transistor directly connected to a voltage supply and a second resistor connected with the first resistor in series;
a soft start circuit, coupled to switching circuit and generating a soft start signal to control the switching signal; and
a comparison circuit, coupled to the input circuit of the power converter and directly connected to the switching circuit to generate a mode signal when the feedback signal of the feedback input circuit is lower than a threshold signal;
wherein the mode signal is connected to control on/off of the transistor of the resistive device so as to modulate an impedance of the resistive device, disable the switching signal for saving power and the mode signal is further coupled to reset the soft start circuit for enabling soft start of the switching signal when switching signal is enabled.

* * * * *